United States Patent Office 3,054,802
Patented Sept. 18, 1962

3,054,802
PODOPHYLLIC ACID HYDRAZIDES
Jürg Rutschmann, Oberwil, Baselland, Switzerland, assignor to Sandoz Ltd., Basel, Switzerland, a Swiss firm
No Drawing. Filed June 9, 1961, Ser. No. 115,935
Claims priority, application Switzerland Oct. 7, 1960
16 Claims. (Cl. 260—340.5)

This application is a continuation-in-part of co-pending application Serial No. 833,953, filed August 7, 1959, now abandoned.

The present invention relates to novel podophyllinic acid hydrazides having the general formula

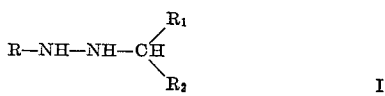

wherein R is either the radical of podophyllinic acid having the molecular formula $C_{22}H_{23}O_8$ or its $C_3$-epimer, picropodophyllinic acid of molecular formula $C_{22}H_{23}O_8$;
$R_1$ stands for hydrogen or lower alkyl, and
$R_2$ stands for an alkyl radical or a cycloalkyl radical or an aralkyl radical.

With regard to the nomenclature of these compounds we refer to the publication of J. Rutschmann and J. Renz, Helv. chim. acta vol. XLII, 3 (1959), No. 100.

The preparation of podophyllotoxin and picropodophyllin is described by W. M. Hearon, Chem. Reviews 55, 1002 (1955).

For preparation of the novel podophyllinic acid hydrazides there are three processes of general utility which are described herein.

In a first method the new hydrazide derivatives are prepared by reducing at the C=N double bond compounds, e.g., hydrazones, having the general formula

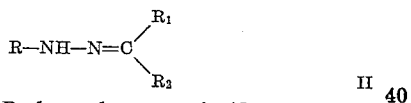

wherein R, $R_1$ and $R_2$ have the same significances as in Formula I.

As reduction agents there may be used on the one hand combinations of molecular hydrogen with a known hydrogenation catalyst, for example, metals of the 8th group of the periodic system, preferably nickel, and on the other hand compounds belonging to the group of metallic hydrides, for example, sodium borohydride.

Reduction is effected in a suitable solvent, for example, water, lower alcohols or in a mixture of water and lower alcohols. Reduction may be carried out at elevated temperatures and pressures if desired.

It also lies within the scope of this invention to combine the preparation of hydrazones corresponding to the general Formula II from an epimeric podophyllinic acid hydrazide and a carbonyl compound with the reduction stage in a single process; in this way the new compounds may be produced from the podophyllinic acid hydrazides in one preparatory step.

The process for the preparation of the starting material, i.e., the hydrazones corresponding to the general Formula II, is described in applicant's copending United States application, Serial Number 739,009, filed June 2, 1958. As shown in applicant's copending application the hydrazone derivatives having the general Formula II may thus be obtained by reacting hydrazide derivatives having the general Formula IV with carbonyl compounds having the general formula

wherein $R_1$ and $R_2$ have the same significance as in Formula I. The hydrazides on the other hand are obtained by cleavage of the lactone ring with hydrazine from the two corresponding lactones, the natural podophyllotoxin and its $C_3$-epimer picropodophyllin formed from podophyllotoxin by treatment with alkali.

According to a second method of preparation, the new compounds of Formula I are prepared by reacting podophyllinic acid hydrazides having the general formula

$$R-NH-NH_2 \qquad IV$$

wherein R has the same significance as in Formula I, with an alkylating agent having the general formula

wherein $R_1$ and $R_2$ have the same significance as in Formula I and X denotes for example halogen or the radical of a sulpho acid or an alkyl sulfuric acid.

This process may, for example, be carried out as follows: The hydrazide compound IV is heated in an inert solvent, for example, an aliphatic alcohol, to an elevated temperature, for example, to the boiling point of the solvent, with at least the molar amount of the alkylating agent in the presence of an acid-binding agent, for example, sodium bicarbonate, magnesium oxide or calcium carbonate.

According to a third method of preparation, the compounds corresponding to the general Formula I are prepared by reacting podophyllotoxin and picropodophyllin with hydrazines having the general formula

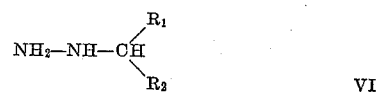

wherein $R_1$ and $R_2$ have the same significance as in Formula I. For this purpose podophyllotoxin or picropodophyllin and the hydrazine compound are heated together, with or without using an indifferent solvent, for example, an alcohol, or an acid buffer, for example, acetic acid.

As a rule it is possible to prepare each of the new hydrazide derivatives mentioned herein using any of the three processes described in the present invention. In some cases, however, one process may prove to be advantageously used over another as far as the costs of the starting material, or less complication in the process for obtaining the new compounds, or for obtaining better yields.

The reduction of the compounds having the general Formula II at the C=N double bond as described for the first process is most generally applicable to provide best yields and least complications.

Reaction of podophyllinic acid hydrazides having the general Formula IV in accordance with the second method with an alkylating agent having the general Formula V is preferably effected for the preparation of derivatives which could be further reduced if prepared according to the first modification of the process. Reaction of podophyllotoxin and picropodophyllin with hydrazines having the general Formula VI offers special practical advantages for the preparation of lower alkyl hydrazides. Thus, the three modifications of the process for the preparation of new hydrazide derivatives complement one another extremely well in their optimal ranges of application.

As will be seen from the specific examples set forth hereinafter, as a rule the novel podophyllinic acid hydrazides in accordance with Formula I are separated from the reaction mixture by conventional methods like extracting the product with a solvent, purifying the extract by reprecipitation and crystallization. In some cases chromatography an adsorbents such as silica gel is used to recover the uniform product.

Illustrative powder podophyllinic acid hydrazides under Formula I are the following:

1-isopropyl-2-podophyllinic acid hydrazide
1-isopropyl-2-picropodophyllinic acid hydrazide
1-n-hexyl-2-podophyllinic acid hydrazide
1-n-hexyl-2-picropodophyllinic acid hydrazide
1-n-octyl-2-podophyllinic acid hydrazide
1-n-octyl-2-picropodophyllinic acid hydrazide
1-n-decyl-2-podophyllinic acid hydrazide
1-n-decyl-2-picropodophyllinic acid hydrazide
1-n-dodecyl-2-podophyllinic acid hydrazide
1-cyclohexyl-2-podophyllinic acid hydrazide
1-cyclohexyl-2-picropodophyllinic acid hydrazide
1-butyl-2-podophyllinic acid hydrazide
1-butyl-2-picropodophyllinic acid hydrazide
1-benzyl-2-podophyllinic acid hydrazide
1-benzyl-2-picropodophyllinic acid hydrazide
1-phenyl-ethyl-2-podophyllinic acid hydrazide
1-phenyl-ethyl-2-picropodophyllinic acid hydrazide
1-methyl-2-podophyllinic acid hydrazide
1-methyl-2-picropodophyllinic acid hydrazide
1-ethyl-2-podophyllinic acid hydrazide The new compounds of the invention may advantageously be used externally in cases where cell division activity must be slowed down or inhibited for medical reasons, for example, in all cases of proliferative diseases of the skin and mucous membranes, such as warts, condyloma, hyperkeratosis, etc. For the therapeutic application of podophyllinic acid derivatives their toxicity is of decisive importance. The new hydrazide derivatives prepared according to the present invention exhibit an antimitotic action which equals that of podophyllotoxin; they even surpass the latter in that they show no general cytotoxicity (no injuries to the bone marrow even in high dosage) and are free from such side effects as nausea, vomiting and diarrhea.

Furthermore, the new hydrazide derivatives distinguish themselves by a distinctly lower general toxicity as compared with podophyllotoxin.

In the following examples, which illustrate the process without limiting the scope of the invention in any way, all temperatures are given in degrees centigrade.

EXAMPLE I

*Preparation of 1-Isopropyl-2-Podophyllinic Acid Hydrazide by Reduction Using Raney Nickel Catalyst (Method I)*

5.0 g. of isopropylidene-podophyllinic acid hydrazide are dissolved in a mixture of 50 cc. of alcohol and 25 cc. of water and hydrogenated with 2.5 g. of Raney nickel at 20° and under normal atmospheric pressure until 1 mol equivalent of hydrogen has been taken up. After filtration of the catalyst the solution is evaporated to dryness in vacuo, and the residue is chromatographed over a column of 100 g. of silica gel. To remove impurities, the residue is then washed with 1000 cc. of chloroform containing 1½% of methanol. The principal amount of the substance is then eluted with chloroform and 5% of methanol (1000 cc.). Pure 1-isopropyl-2-podophyllinic acid hydrazide is then obtained from this fraction by recrystallization from water. It melts at 80–90° with loss of the crystallizing water and shows a specific rotation of $[\alpha]_D = -155°$ (c.=0.4 in chloroform) after drying at 100° in a high vacuum.

EXAMPLE II

*Preparation of 1-n-Hexyl-2-Podophyllinic Acid Hydrazide by Reduction Using Raney Nickel Catalyst (Method I)*

5.0 g. of n-hexylidene-podophyllinic acid hydrazide are hydrogenated in the manner described in Example I and the reaction product is chromatographed. The main fraction is eluted with chloroform and 5% of methanol from the column of silica gel. Precipitation with petroleum ether yields an amorphous powder, 1-n-hexyl-2-podophyllinic acid hydrazide. $[\alpha]_D = -119°$ (c.=0.4 in chloroform. Alternatively the working up of the hydrogenation mixture is effected in the following way: The hydrogenation solution is diluted with water and extracted with ether. The residue remaining after evaporation of the ether is taken up in chloroform, and the product precipitated by the addition of petroleum ether.

EXAMPLE III

*Preparation of 1-Octyl-2-Podophyllinic Acid Hydrazide by Reduction Using Raney Nickel Catalyst (Method I)*

1-n-octyl-2-podophyllinic acid hydrazide is prepared in analogous manner to that of Example II from n-octylidene-podophyllinic acid hydrazide. It is obtained as an amorphous powder after re-precipitation from chloroform-petroleum ether. $[\alpha]_D = -102°$ (c.=0.4 in chloroform).

EXAMPLE IV

*Preparation of 1-n-Decyl-2-Podophyllinic Acid Hydrazide by Reduction With Raney Nickel Catalyst (Method I)*

1-n-decyl-2-podophyllinic acid hydrazide is obtained in analogous manner to that of Example II from n-decylidenepodophyllinic acid hydrazide. $[\alpha]_D = -105°$ (c.=0.4 in chloroform).

EXAMPLE V

*Preparation of 1-n-Dodecyl-2-Podophyllinic Acid Hydrazide by Reduction With Raney Nickel (Method I)*

1-n-dodecyl-2-podophyllinic acid hydrazide is obtained in analogous manner to that of Example II from n-dodecylidene-podophyllinic acid hydrazide. $[\alpha]_D = -107°$ (c.=0.4 in chloroform).

EXAMPLE VI

*Preparation of 1-Phenyl-Ethyl-2-Podophyllinic Acid Hydrazide by Reduction With Raney Nickel (Method I)*

1-phenyl-ethyl-2-podophyllinic acid hydrazide is obtained in analogous manner to that of Example II from phenyl-ethylidene-podophyllinic acid hydrazide.

$[\alpha]_D = -111°$ (c.=0.4 in chloroform)

EXAMPLE VII

*Preparation of 1-Cyclohexyl-2-Podophyllinic Acid Hydrazide by Reduction With Raney Nickel (Method I)*

1-cyclohexyl-2-podophyllinic acid hydrazide is obtained in analogous manner to that of Example II from cyclohexylidene-podophyllinic acid hydrazide. $[\alpha]_D = -155°$ (c.=0.4 in chloroform).

EXAMPLE VIII

*Preparation of 1-n-Hexyl-2-Podophyllinic Acid Hydrazide by Reduction With Raney Nickel (Method I)*

2.0 g. of podophyllinic acid hydrazide together with 2.0 g. of caproic aldehyde in 25 cc. of fine spirit are hydrogenated with 1.0 g. of Raney nickel until all of the hydrogen has been taken up. After working up as described in Examples II to VII, 1-n-hexyl-2-podophyllinic acid hydrazide is obtained, which is identical with the end product obtained in Example II.

EXAMPLE IX

*Preparation of 1-n-Hexyl-2-Podophyllinic Acid Hydrazide by Reduction With Sodium Borohydride (Method I)*

2.0 g. of n-hexylidene-podophyllinic acid hydrazide are dissolved in 50 cc. of 75% methanol and treated in portions with 4.0 g. of sodium borohydride. The mixture is heated to 50° for 1 hour with stirring, diluted with saturated sodium chloride solution and shaken out with chloroform. The evaporation residue of the chloroform solution is chromatographed as described above. There is obtained 1-n-hexyl-2-podophyllinic acid hydrazide, which is identical with the end product obtained in Example II.

EXAMPLE X

*Preparation of 1-Isopropyl-2-Podophyllinic Acid Hydrazide by Reduction With Raney Nickel (Method I)*

1-isopropyl-2-podophyllinic acid hydrazide is obtained in analogous manner to that of Example I from isopropylidene-picropodophyllinic acid hydrazide. It is precipitated from chloroform by addition of petroleum ether to give an amorphous powder. $[\alpha]_D = -81°$ (c.=0.5 in chloroform).

EXAMPLE XI

*Preparation of 1-n-Hexyl-2-Picropodophyllinic Acid Hydrazide by Reduction With Raney Nickel (Method I)*

1-n-hexyl-2-picropodophyllinic acid hydrazide is obtained in analogous manner to that of Example II from n-hexylidene-picropodophyllinic acid hydrazide.

$[\alpha]_D = -57°$ (c.=0.5 in chloroform).

EXAMPLE XII

*Preparation of 1-Methyl-2-Picropodophyllinic Acid Hydrazide by Alkylation With Methyl Iodide (Method II)*

2.0 g. of picropodophyllinic acid hydrazide in 20 cc. of methanol and 2 cc. of water are boiled unter reflux for 1 hour with 4 cc. of methyl iodide and 0.5 g. of sodium bicarbonate. The solution is concentrated in vacuo, diluted with sodium chloride solution and shaken out with chloroform. The evaporation residue of the chloroform solution is dissolved in hot benzene. On cooling 1-methyl-2-picropodophyllinic acid hydrazide is precipitated as a white powder. $[\alpha]_D = -61°$ (c.=0.5 in choloform). Analysis shows the presence of an n-CH$_3$-group.

EXAMPLE XIII

*Preparation of 1-Methyl-2-Podophyllinic Acid Hydrazide by Alkylation With Methyl Iodide (Method II)*

1-methyl-2-podophyllinic acid hydrazide is obtained in analogous manner to that of Example XII—with 5 g. of calcium carbonate used as acid-binding agent, however— by methylation of podophyllinic acid hydrazide with methyl iodide. $[\alpha]_D = -160°$ (c.=0.4 in chloroform).

EXAMPLE XIV

*Preparation of 1-Benzyl-2-Podophyllinic Acid Hydrazide by Alkylation With Methyl Iodide (Method II)*

2.0 g. of podophyllinic acid hydrazide are boiled under reflux for 2 hours with 1 cc. of benzyl chloride, 2 g. of calcium carbonate and 5 cc. of methanol. The solution is diluted with water and shaken out with chloroform. The evaporation residue of the chloroform solution is chromatographed over 50 g. of silica gel. To remove impurities, the column is washed with chloroform and 1½% of methanol and the principal amount of the substance is then eluted with chloroform and 5% of methanol. Re-precipitation of this fraction from chloroform yields 1-benzyl-2-podophyllinic acid hydrazide.

$[\alpha]_D = -115°$ (c.=0.5 in chloroform)

EXAMPLE XV

*Preparation of 1-Benzyl-2-Picropodophyllinic Acid Hydrazide by Alkylation With Benzyl Chloride (Method II)*

1-benzyl-2-picropodophyllinic acid hydrazide is obtained in analogous manner to that of Example XIV— with boiling under reflux for one hour only, however— from picropodophyllinic acid hydrazide. $[\alpha]_D = -15°$ (c.=0.4 in chloroform).

EXAMPLE XVI

*Preparation of 1-Methyl-2-Picropodophyllinic Acid Hydrazide by Reaction With Methyl Hydrazide (Method III)*

1 g. of picropodophyllin is heated on the water bath with 1 cc. of methyl hydrazine. 5 cc. of methanol are added to the solution which is then boiled under reflux for 1 hour. The evaporation residue of the solution is chromatographed in a manner similar to that described in Example I. 1-methyl-2-picropodophyllinic acid hydrazide is eluted by washing the silica gel column with chloroform and 5% of methanol and is obtained in pure form after solution in hot benzene and cooling have been effected. The end product is identical in every respect with the compound produced in Example XII.

EXAMPLE XVII

*Preparation of 1-Butyl-2-Picropodophyllinic Acid Hydrazide by Reaction With Butyl Hydrazine (Method III)*

1 g. of picropodophyllin is heated on the water bath with 1 cc. of n-butyl-hydrazine. 5 cc. of methanol are added to the solution which is then worked up as described in Example XVI. 1-butyl-2-picropodophyllinic acid hydrazide is obtained as an amorphous powder by precipitation from chloroform with petroleum ether. $[\alpha]_D = -61°$ (c.=0.5 in chloroform).

EXAMPLE XVIII

*Preparation of 1-Ethyl-2-Podophyllinic Acid Hydrazide by Reduction With Raney Nickel (Method I)*

500 g. of podophyllinic acid hydrazide are heated together with 150 cc. of acetaldehyde with 2200 cc. of methanol to 40°. The solution obtained is filtered and then cooled. The product which crystallizes out is filtered off with suction and washed with methanol. Together with a second fraction obtained after concentration of the mother liquors there are produced 450 g. of podophyllinic acid ethylidene hydrazide, having a melting point of 222–224° and a specific rotation of $[\alpha]_D = -285°$ (c.=0.5 in ethanol).

The product is hydrogenated in 4000 cc. of ethanol at room temperature and under normal atmospheric pressure with a catalyst prepared in the usual manner from 400 g. of Raney nickel alloy. The calculated amount of hydrogen is taken up in approximately 75 hours. After filtration and evaporation to a small volume, the residue is distributed between 1000 cc. of chloroform and water each. The chloroform solution is then dried over sodium sulfate and evaporated to a small volume. Precipitation of the hydrogenation product with petroleum ether yields an amorphous white powder which is filtered by suction, washed with petroleum ether and dried at 50° in a high vacuum. 1-ethyl-2-podophyllinic acid hydrazide which is obtained in a practically quantitative yield shows a specific rotation of $[\alpha]_D = -154°$ (c.=0.5 in chloroform).

I claim:
1. A compound selected from the class consisting of hydrazides of picropodophyllinic acid of Formula I

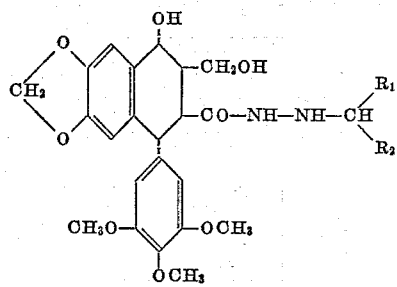

in which $R_1$ is a member selected from the group consisting of hydrogen and lower alkyl and $R_2$ is a member of the group consisting of an alkyl radical containing from 1 to 20 carbon atoms, a cycloalkyl radical containing from 5 to 8 carbon atoms and an aralkyl radical containing from 7 to 10 carbon atoms; and the corresponding hydrazides of podophyllinic acid.

2. 1-methyl-2-picropodophyllinic acid hydrazide.
3. 1-isopropyl-2-picropodophyllinic acid hydrazide.
4. 1-isopropyl-2-podophyllinic acid hydrazide.
5. 1-methyl-2-podophyllinic acid hydrazide.
6. 1-benzyl-2-picropodophyllinic acid hydrazide.
7. 1-benzyl-2-podophyllinic acid hydrazide.
8. 1-phenyl-ethyl-2-podophyllinic acid hydrazide.
9. 1-n-dodecyl-2-podophyllinic acid hydrazide.
10. 1-cyclohexyl-2-podophyllinic acid hydrazide.
11. 1-n-hexyl-2-podophyllinic acid hydrazide.
12. 1-n-octyl-2-podophyllinic acid hydrazide.
13. 1-n-decyl-2-podophyllinic acid hydrazide.
14. 1-n-hexyl-2-picropodophyllinic acid hydrazide.
15. 1-butyl-2-picropodophyllinic acid hydrazide.
16. 1-ethyl-2-podophyllinic acid hydrazide.

No references cited.